United States Patent [19]

Koshkin et al.

[11] 4,140,465
[45] Feb. 20, 1979

[54] THERMOPLASTIC POLYMER INJECTION MOULDING MACHINE

[76] Inventors: Lev N. Koshkin, 3 Samotechny pereulok, 23, kv. 54, Moscow; Valery M. Semenov, ulitsa Fevralskaya, 11, kv. 11, Klimovsk Moskovskoi oblasti; Jury A. Repin, ulitsa Simferopolskaya, 19, kv. 59, Klimovsk Moskovskoi oblasti; Anatoly M. Pozdnyakov, Simferopolskaya ulitsa, 19, kv. 71, Klimovsk Moskovskoi oblasti; Nikolai Z. Lutskov, p/o Znamya Oktyabrya, 5, kv. 12, Podolsk Moskovskoi oblasti, all of U.S.S.R.

[21] Appl. No.: 816,963

[22] Filed: Jul. 19, 1977

[30] Foreign Application Priority Data

Jul. 22, 1976 [SU] U.S.S.R. .............................. 2387872

[51] Int. Cl.² .............................................. B29F 1/04
[52] U.S. Cl. .................................... 425/559; 425/574; 425/576
[58] Field of Search ............... 425/576, 557, 558, 559, 425/561, 562, 564, 563; 264/328

[56] References Cited

U.S. PATENT DOCUMENTS

| | | | |
|---|---|---|---|
| 3,020,591 | 2/1962 | Breher et al. | 425/558 |
| 3,247,304 | 4/1966 | Ninneman | 425/558 |
| 3,833,329 | 9/1974 | Ulmachneider | 425/576 |

Primary Examiner—William R. Briggs
Attorney, Agent, or Firm—Lackenbach, Lilling & Siegel

[57] ABSTRACT

The proposed machine incorporates a rotatable support on which injection cylinders which cooperate with actuating hydraulic cylinders are mounted. Each injection cylinder accommodates a ram and a nozzle which are capable of mutual axial motion. The actuating hydraulic cylinder is coupled directly to the ram which engages the nozzle at the moment they come into contact. The injection cylinder is fitted with internal annular grooves, one of which communicates with a plasticator.

The nozzle is provided with channels for placing in communication a cavity, defined between the ram and the nozzle, and the nozzle outlet orifice via one of the annular grooves.

2 Claims, 4 Drawing Figures

THERMOPLASTIC POLYMER INJECTION MOULDING MACHINE

BACKGROUND OF THE INVENTION

1. Field of the Invention

The invention relates to devices for processing plastic materials and, more particularly, to machines for injection moulding of thermoplastic polymers.

The invention may find a most effective use for injection moulding of variously-shaped items of small volumes of up to 40 cm$^3$, e.g., for the manufacture of wine bottle stoppers, plug socket housings and various threaded sealing items.

2. Description of the Prior Art

There is known in the art a thermoplastic polymer injection molding machine (Zavgorodny V. K., "Mehanizatsiya i avtomatizatsiya pererabotki plasticheskih mass" /Mechanization and automation of plastics processing/, "Mashinostroeniye" Publishers, Moscow, 1970, p. 256–258) incorporating a continuously rotatable support carrying, on its periphery, injection cylinders and actuating hydraulic cylinders.

The machine incorporates a plasticator connected to the injection cylinders by means of a hollow shaft and heated radial channels in said support, a non-return valve being inserted in each of the channel outlet orifices. Injection dies are arranged on the perimeter of the support between the injection cylinders and the actuating hydraulic cylinders. Each injection cylinder carries a nozzle with an outlet orifice movable with respect to the injection cylinder and fitted with a rotary shut-off valve that prevents undesired discharge of polymer.

The productivity of such a machine is limited by the number of injection dies accommodated in the rotatable support which cannot be increased arbitrarily, as, in turn, it will lengthen the radial channels whose length is limited of the pressure development by the plasticator and the admissible dwell time in the distribution channels, with the effect that practical productivity is never higher than 20 mouldings per minute.

In addition, the injection cylinder nozzles in the machine are constantly outside the heated body of the rotatable support and are thus cooled excessively due to contact with the cold die air and the surrounding air, in particular, near the nozzle outlet orifices, this having an adverse effect on injection and, in consequence, upon the quality of moulded items.

And, finally, as the injection die is backed away from the injection cylinder, a portion of the molten material is forced out of the nozzle outlet orifice and may plug up or block the gate orifice.

Also known in the prior art is a machine for moulding items from a thermoplastic polymer incorporating at least one rotatable support with injection cylinders and actuating hydraulic cylinders set at its periphery. A plasticator is connected to the injection cylinders by means of a hollow shaft and heated radial channels in said support, each of the injection cylinder outlets carrying a non-return valve. Injection dies are placed on a closed-chain conveyor, bending round the support, between the injection cylinders and the actuating hydraulic cylinders, each injection cylinder incorporating a mobile nozzle with an outlet orifice, inserted into which is a rotary shut-off valve that prevents the undesired discharge of polymer.

This prior-art machine provides a considerably higher output as compared to the former device, as its productivity is in no way limited by the number of dies on the conveyor, this number being a function of the specified productivity target and the time necessary to cool moulded items outside the rotatable support. The substantial raise in productivity is due to a molten polymer being injected into the dies while they are on the rotatable support, whereas moulded items are cooled, ejected, etc., outside the rotatable support as the dies move with the conveyor.

However, the prior-art machine fails to attain a higher productivity due to disadvantages inherent in its design.

The productivity of the aforesaid known machine cannot be increased by increasing the rate of operation of injection cylinders as their service reliability decreases sharply due to the poor performance of non-return and rotary shut-off valves whose durabilities are low.

The productivity of the prior art machine is 50 to 120 items per minute as the nozzle is returned to the starting position after it co-operates with the injection die by overcoming the resistance the nozzle offers to the motion with the aid of the pressure exerted by the melt upon the nozzle end face, the value of the resistance being governed by the viscous friction of the molten material in the gap between the nozzle lateral surface and the internal side surface of the injection cylinder. A point to note is that viscous friction is an exponential function of the shear velocity of adjacent layers of melt, this rendering impossible a high back-out velocity of the nozzle to its starting position and the filling of the injection cylinder with a fresh portion of material even if the material is supplied at a high pressure.

Another disadvantage is that the machine fails to ensure the required quality of items, as the injection cylinder outlets are cooled excessively due to their location outside the heated support and their contact with the cold dies. The material then solidifies in the outlet, is forced inside the dies during the injection that follows and thus may be responsible for the discarding of the item.

As the injection cylinders in the said machine remain outside the heated support for a substantial period of time, they tend to cool and thus cool the portion of the material they hold, this prohibiting the operation of the machine on thermoplastic materials that require accurate maintenance of their temperatures within a narrow range before injection into dies.

And, finally, the great number of non-return valves and rotary shut-off valves complicates the machine and increases its cost.

SUMMARY OF THE INVENTION

It is therefore an object of the present invention to eliminate the above disadvantages by enhancing the reliability of a thermoplastic polymer injection moulding machine and improving the quality of items produced in it.

Another object of the invention is to simplify the design of a thermoplastic polymer injection moulding machine.

Still another object of the invention is to enhance the efficiency of a thermoplastic polymer injection moulding machine.

And, finally, an object of the present invention is to expand the processing capability of a thermoplastic polymer injection molding machine.

The above and other objects are attained by a thermoplastic polymer injection molding machine incorporating a rotatable support with built-in actuating hydraulic cylinders and injection cylinders with nozzles; and a plasticator coupled to the injection cylinders and the injection dies mounted on a closed-chain conveyor traveling round the rotatable support. According to the invention, the actuating hydraulic cylinders are coupled directly to rams of the injection cylinders provided with annular grooves on their internal surface, one of which communicates with the plasticator. The ram and the nozzle are capable of mutual axial motion inside the injection cylinder and support a device for engaging them at the moment they come into contact. The nozzle is fitted with channels which connect, when the nozzle contacts the injection die, a cavity defined between the ram and the nozzle, and the nozzle outlet orifice via one of the annular grooves.

It is necessary that the nozzle channels open on their side surface in direct proximity with the injection cylider, one of the channels communicating with the nozzle outlet orifice, and the other communicating with the cavity inside the nozzle, the two channels communicating with each other in a specified position of the ram via one of the injection cylinder annular grooves.

The herein proposed machine is reliable in service and ensures a higher efficiency than the prior-art machines of similar type. This is obtained by a judicious design of injection cylinders which condition inside their heated housings a portion of molten material before it is injected into a die. This design improves the quality of the items, particularly, ones from materials which require no accurate maintenance of their temperature within a specified range directly prior to injection into dies.

Introduction of a device for coupling the ram and the nozzle renders it possible to return the nozzle to its starting position after the molten material has been injected into the dies and also contributes to the mutual motion of the ram and the nozzle when the material is being injected into a die, this building up a pressure inside the cavity between the nozzle and the ram being sufficient to force the molten polymer inside the die.

The design of the machine being offered is simplified through the use of various shut-off elements in the injection cylinders.

In accordance with an embodiment of the invention the device for coupling the ram to the nozzle is a ram head set freely inside the nozzle cavity.

BRIEF DESCRIPTION OF THE DRAWINGS

Other aims and advantages of the present invention will become readily apparent from an embodiment of the invention which will now be described by way of example with reference to the accompanying drawings, in which:

FIG. 4 is an elevational cross-sectional view of an injection cylinder as molten polymer is being forced into an injection die.

DESCRIPTION OF THE PREFERRED EMBODIMENT

Figure 1:
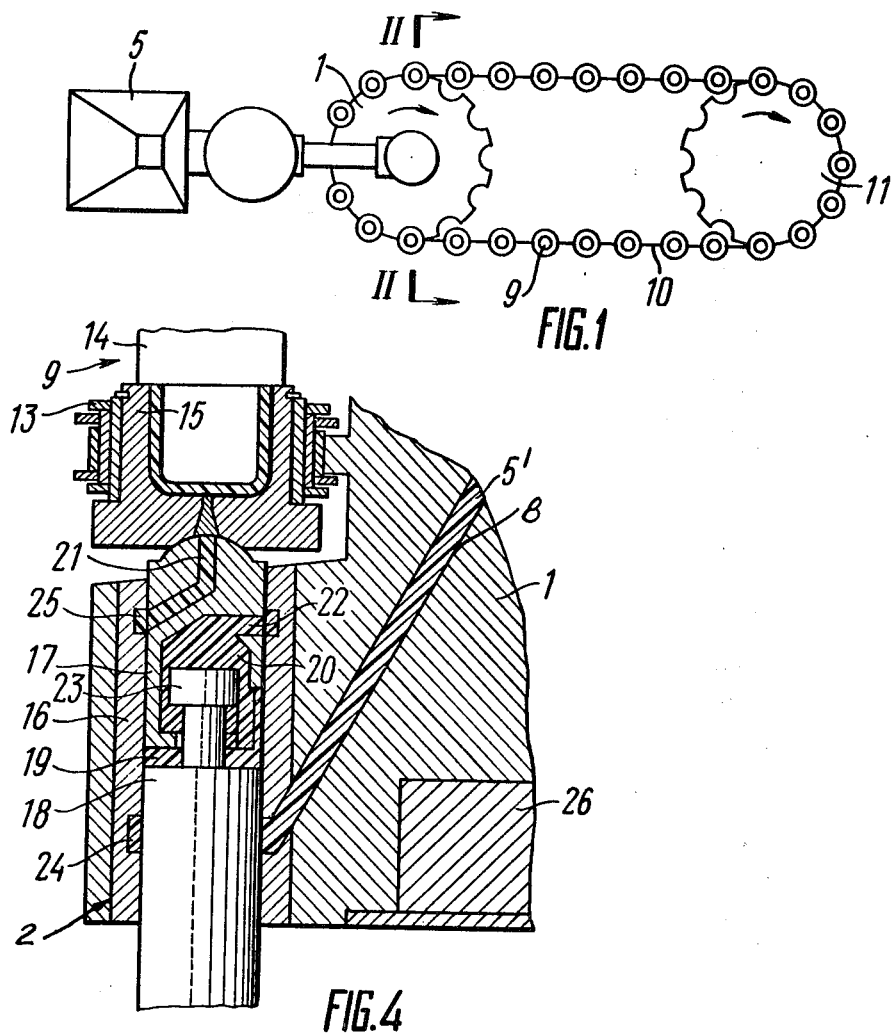
FIG. 1 is a schematic, top plan view of a machine in accordance with the invention.
Figure 2:
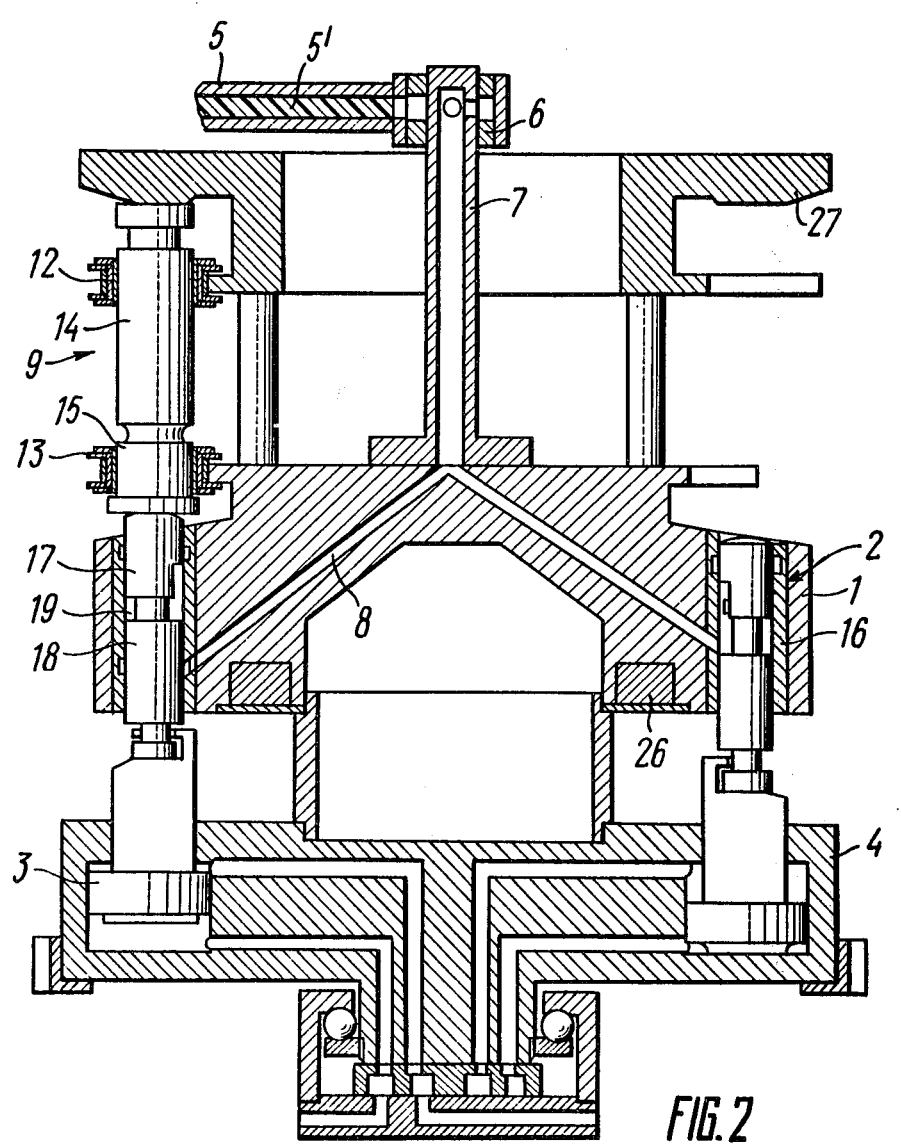
FIG. 2 is a cross-sectional view taken along the line II—II in FIG. 1.
Figure 3:
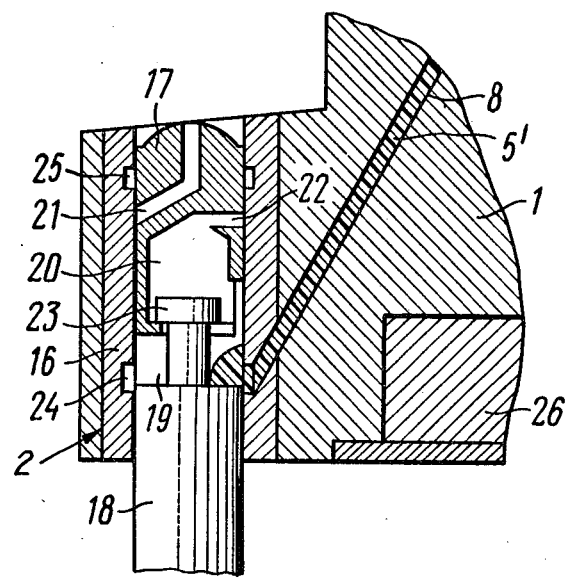
FIG. 3 is an elevational cross-sectional view of an injection cylinder as it is being filled with molten polymer.

An injection moulding machine (FIGS. 1 and 2) incorporates a heated rotatable support 1 with injection cylinders 2 mounted on its periphery; actuating hydraulic cylinders 3 arranged on the periphery of a drum 4 connected rigidly to the support 1; and a plasticator 5 with molten material 5 fixed in a stationary position with respect to the support 1 and coupled to the injection cylinders 2 with the aid of a header 6, a hollow shaft 7 and radial channels 8 inside of the support 1.

The plasticator 5 may be of any conventional type, but screw-type heated ones are preferable.

In addition, the machine of the invention comprises injection dies 9 placed or arranged on a closed conveyor 10 which travels around the rotatable support 1 and also around a rotatable support 11 adapted to remove finished items from the dies 9.

The conveyor 10 and the dies 9 may be of any conventional construction, though it is preferable that the conveyor 10 consist of two closed chains 12 and 13. Axially movable male dies 14 are carried by links of the top chain 12 and axially movable female dies 15 are set in links of the bottom chain 13.

Each injection cylinder 2 is a fixed hollow housing 16 in which there are accommodated a nozzle 17 and a ram 18 coupled to one another and axially mutually movable inside the housing 16 so that a cavity 19 of a variable volume is defined between the bottom face of the nozzle 17 and the top face of the ram 18.

The nozzle 17 is formed with a cavity 20 and channels 21 and 22 opening up on the side surface of the nozzle 17 which is in direct proximity with the injection cylinder housing 16, the channel 21 communicating with the outlet orifice of the nozzle 17, and the channel 22 communicating the cavity 20 of the nozzle 17.

The ram 18 is fitted with a head 23 located freely inside the cavity 20 of the nozzle 17. A bottom end or the opposite end of the ram is coupled to the actuating hydraulic cylinder 3.

The internal surface of the housing 16 of the cylinder 2 is provided with annular grooves 24 and 25, the groove 24 communicating with the radial channel 8 connected to the plasticator 5 and the other groove 25 placing in communication the cavity 19 and the outlet 21 of the nozzle 17.

The support 1 is fitted with electric heaters 26 for heating the injection cylinders 2 and surmounted by a disk 27 rigidly attached thereto against which rest the injection dies 9 when they are being injected with the molten material 5'.

Once the machine is energized, a gearing actuates synchronously the rotatable supports 1 and 11 and the conveyor 10. The plasticator 5 continuously supplies the molten material 5' via the header 6, the hollow shaft 7 and the channels 8 in the support 1 to the injection cylinders 2, and the cylinders 2 in which the annular grooves 24 of the housings 16 are not shut off by the rams 18 are filled with molten material 5'.

As the support 1 rotates, the hydraulic actuating cylinders 3 are caused to move upwards throughout the stretch of arc where the support 1 gears up with the conveyor 10. The actuating hydraulic cylinders 3 cause the corresponding rams 18 to ascend and thus to shut off with its side surface the groove 24 of the housing 16, thereby compressing in the process the molten material 5' inside the cavity 19. As the ram 1 moves further, the material compressed inside the cavity 19 acts upon the nozzle 17 with the effect that the nozzle moves upwards. The nozzle's head co-operates with the female die 15 and lifts it slightly in the link of the chain 13 so that the male die 14 comes to bear against the bearing disk 27 (FIG. 4). In this position, which corresponds to injection of the molten material 5' into the injection die 9, the channels 21 and 22 of the nozzle 17 communicate with the annular groove 25 of the housing 16 with the effect that the molten material 5' is injected into the injection die 9 via the outlet orifice of the nozzle 17. The ram 18 ascends further and reduces the volume of the cavity 19 to a minimum which corresponds to the end of injection of the material 5' into the injection die 9.

As the ram 9 goes up, its head 23 moves freely inside the cavity 20 of the nozzle 17. The pressure of the molten material 5' inside the cavity 19 due to the action of the ram 18 is much greater than that of the molten material 5' supplied by the plasticator 5.

Should the injection die 9 be removed, e.g., for repairs, from the link of the conveyor 10, the nozzle 17 will be caused to move to a position higher than that in which its channels 21 and 22 communicate with the annular groove 25, thereby preventing an undesired discharge of the molten material 5'.

Further rotation of the support 1 results in that the actuating cylinders 3 descend and cause the rams 18 to move down. The descent of the ram 18 inside the cavity 19 builds up a vacuum which sucks the molten material 5' disposed inside the outlet orifice of the nozzle 17 back into the cavity 19. In the process, the ram 18 engages, with its head 23 the nozzle 17 which is thus also caused to descend. Because of the appreciable friction between the head 23 of the nozzle 17 and the female die 15, the female die 15 goes down as well, with the effect that the injection die 9 returns to its starting position on the conveyor 10. The moment the nozzle 17 backs away from the female die 15, nozzle shuts off with by its side surface the snnular groove 25 and thus isolates its outlet orifice from the cavity 19. As the ram 18 moves further down, the annular groove 24 is connected to the cavity 19 with the effect that a fresh portion of the material 5' fills the cavity 19 and the above cycle, is then repeated.

As the support 1 rotates, the injection dies 9 with moulded items are carried to the support 11 for discharge of finished items. Once moulded, the items are cooled inside the injection dies 9 as the dies 9 move towards the support 11. If necessary, this stretch of the conveyer can be provided with devices for cooling the outside surface of the injection dies 9. In the support 11, the male dies 14 separates from the female die 15, whereby a moulded item is removed from the male die 14 after which the die 14 closes with the female die 15, and the injection dies 9 are transported by the conveyor 10 to the support 1 for the next filling.

The use of the injection moudling machine, for manufacturing items from thermoplastic materials in accordance with the invention, makes it possible to enhance efficiency of the machine and its reliability through improved construction of injection cylinders and elimination of all fault-prone elements.

Such a machine construction makes it possible to attain a productivity in terms of moulded items from thermoplastic materials in the order of 150 to 2000 pcs/min and volume-moulded shots of 5 to 40 cm$^3$.

In addition, as the injection cylinders 2 are placed inside the heated support 1, the material no longer freezes inside the outlet orifice, a fact that makes it possible to improve the quality of the items and to process materials of a narrow injection temperature range.

We claim:

1. A thermoplastic polymer injection molding machine comprising:

a rotatable support with radial channels;

injection cylinders mounted within said support and having an interior surface defining an interior space and on which annular grooves are provided, a first of said annular grooves communicating with a respective radial channel;

a nozzle movably mounted in said interior space of a respective injection cylinder for axial movement with respect to an axis of said respective injection cylinder and having channels, a cavity and an outlet orifice;

a ram movably coupled to said nozzle, having a head positioned in said cavity of said nozzle, movably mounted in said interior space of said respective injection cylinder for axial movement with respect to said axis of said respective injection cylinder, and defining a cavity in said respective injection cylinder between a top surface of said ram, a bottom surface of said nozzle and said interior surface of said respective injection cylinder, said ram effecting communication of said cavity in said respective injection cylinder and said outlet orifice via a second of said annular grooves and through said channels in said nozzle when said axial movement of said ram is being effected;

activating hydraulic cylinders mounted in said support and being operatively associated with a respective ram for effecting said axial movement of said respective ram;

a plasticator in communication with said radial channels;

a conveyor activated by said support; and injection dies supported on said conveyor, a female die portion of each injection die having a bottom portion inlet aligned with said outlet orifice of said nozzle of said respective injection cylinder.

2. A machine is claimed in claim 1, wherein the channels in the nozzle open on a side surface of said nozzle in direct proximity to the injection cylinder, one of said channels communicating with the nozzle outlet orifice, and another of said channels communicating with the nozzle cavity, both channels being brought into communication with one another via said second injection cylinder annular grooves when the ram is in a given position.

* * * * *